United States Patent [19]

Komaki

[11] 4,192,133

[45] Mar. 11, 1980

[54] ELECTRONIC WATCH WITH MEANS FOR PRODUCING PULSE SOUND AT SELECTED INTERVALS

[75] Inventor: Shojiro Komaki, Tokyo, Japan

[73] Assignee: Kabushiki Kaisha Daini Seikosha, Japan

[21] Appl. No.: 824,315

[22] Filed: Aug. 12, 1977

[30] Foreign Application Priority Data

Aug. 13, 1976 [JP] Japan .................................. 51/96826

[51] Int. Cl.$^2$ ............................................. G04C 21/16
[52] U.S. Cl. ...................................... 368/73; 368/109; 368/248; 368/251
[58] Field of Search ............ 58/16 R, 16 D, 18, 19 R, 58/21.11, 21.13, 21.15 S, 57.5, 74, 152 B; 88/38, 39.5, 50

[56] References Cited

U.S. PATENT DOCUMENTS

| | | | |
|---|---|---|---|
| 3,759,029 | 9/1973 | Komaki | 58/38 |
| 4,074,516 | 2/1978 | Kondo | 58/57.5 |
| 4,078,376 | 3/1978 | Freeman | 58/39.5 |

Primary Examiner—Gene Z. Rubinson
Assistant Examiner—Leonard W. Pojunas, Jr.
Attorney, Agent, or Firm—Robert E. Burns; Emmanuel J. Lobato; Bruce L. Adams

[57] ABSTRACT

An electronic watch having chronograph performance is provided with a pulse sound generator for generating a pulse sound at a predetermined interval. The pulse sound generator comprises a counter for counting predetermined clock pulses received from the frequency dividing circuit of the watch, a memory for memorizing a predetermined time interval, manually operable means for selecting the time interval memorized by the memory, a coincidence circuit for detecting coincidence between the contents of the counter and the time interval memorized by the memory and a pulse sound generating circuit for generating a pulse sound when such coincidence occurs.

4 Claims, 1 Drawing Figure

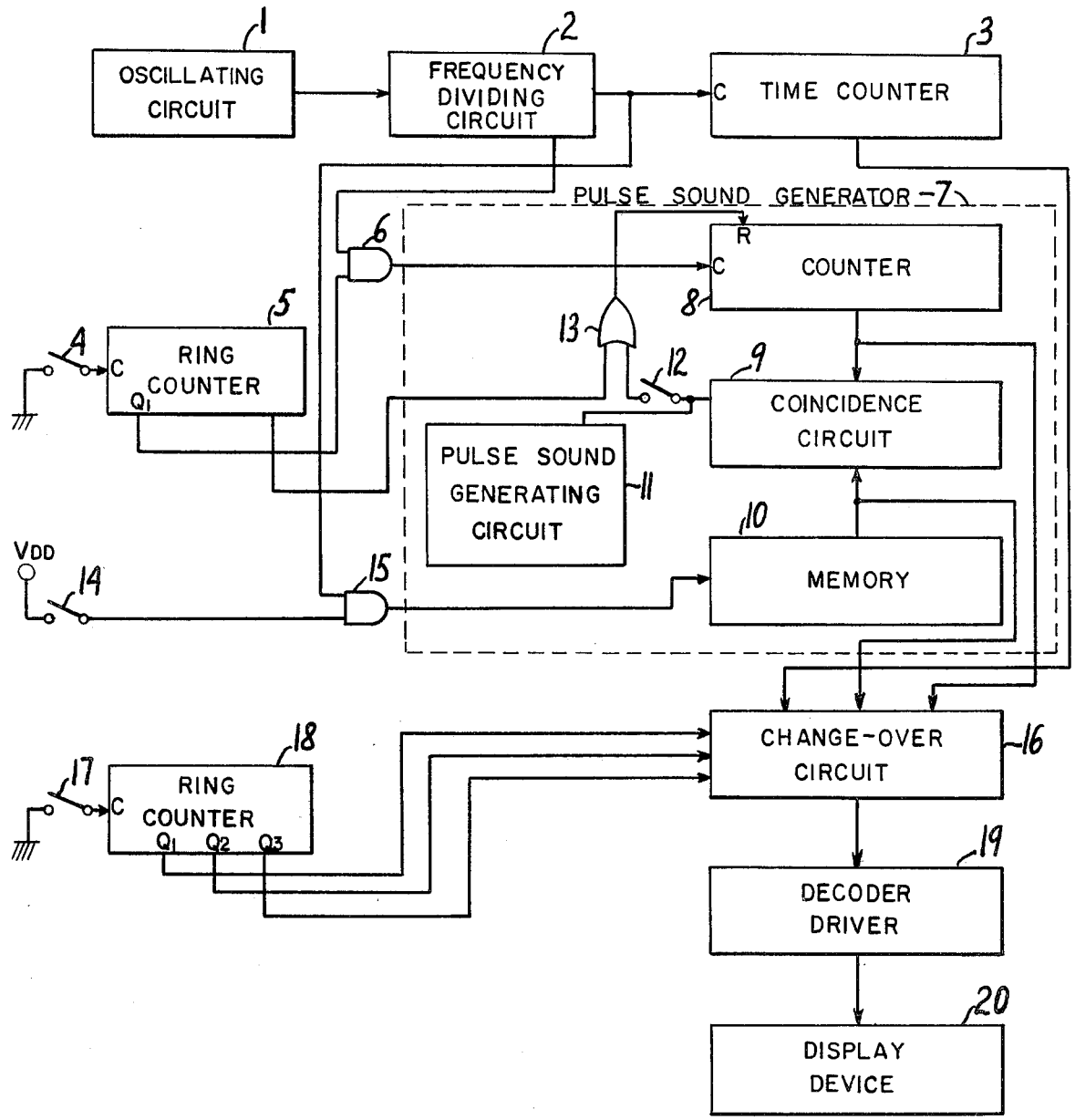

ELECTRONIC WATCH WITH MEANS FOR PRODUCING PULSE SOUND AT SELECTED INTERVALS

FIELD OF INVENTION

The present invention relates to an electronic watch and more particularly to an electronic watch having chronograph performance and provided with means for generating a pulse sound at a predetermined interval.

BACKGROUND OF THE INVENTION

Electronic watches having chronograph performance are known. However, with such watches of the conventional type there is the inconvenience that the display portion of the watch has to be watched in order to ascertain a predetermined lapse of time. For example in the starting of a sail boat race a contestant must watch his watch to determine the lapse of time from a warning whistle or bell in order to know when the starting gun will be fired. This is inconvenient since he needs to devote his entire attention to maneuvering his boat.

SUMMARY OF THE INVENTION

It is an object of the present invention to overcome the above mentioned inconvenience by providing an electronic watch having chronograph performance and means for generating a pulse sound at a predetermined interval which is set by the user. For example the watch can be set to provide a pulse sound every five seconds, each minute or such longer or shorter interval as may be desired.

In a preferred embodiment of the invention, the pulse sound generating means comprises a counter for counting clock pulses received from the frequency dividing circuitry of the electronic watch, a memory for memorizing a selected time interval, manually operable means for selecting the time interval memorized by the memory, a coincidence circuit for detecting coincidence between the counting contents of the counter and the selected time memorized by the memory and a pulse sound generating means controlled by the coincidence circuit to generate a pulse sound when coincidence occurs.

Moreover, in a preferred embodiment of the invention, visual display means of the watch is controlled by a change-over circuit for selectively displaying normal time, a time interval or the selected interval memorized by the memory.

BRIEF DESCRIPTION OF DRAWINGS

The nature, objects and advantages of the invention will be more fully understood from the following description and claims in conjunction with the accompanying drawing which is a circuit diagram showing an embodiment of an electronic watch according to the invention.

DESCRIPTION OF THE PREFERRED EMBODIMENT

As shown by way of example in the drawing, the circuitry of an electronic watch in accordance with the present invention comprises an oscillating circuit 1 using a quartz crystal oscillator or the like to provide a standard signal. The output of the oscillating circuit 1 is frequency divided by a frequency dividing circuit 2 to provide an output of 1 Hz and also an output of a higher frequency for example 100 Hz. The 1 Hz signal is fed to a time counter 3 comprising a 60 notation second counter, a 60 notation minute counter and a 24 notation hour counter. In case of using the watch as a chronograph, the operations of START, STOP and RESET are carried out by a three-step ring counter 5 controlled by a manually operable switch 4. The output terminal $Q_1$ of the ring counter 5 emits a signal of logic "1" when the switch 4 is operated once. This signal is fed to an input terminal of an AND circuit 6 having two inputs. To the other input terminal of the AND circuit 6, a signal of 100 Hz is provided by an output of the frequency dividing circuit 2. The output of the AND circuit 6 is supplied to the input of a counter 8 of a pulse sound generator 7. The counter 8 is provided with a 1/100 second counter, a second counter, a minute counter and an hour counter. The counting output of the counter 8 is fed to a coincidence detecting circuit and also to a change-over circuit 16. The coincidence circuit 9 compares the counting contents of the counter 8 with the memory contents of a memory 10 and outputs a coincidence signal when coincidence occurs. This coincidence signal is fed to a pulse sound generating circuit 11 and also through a switch 12 and OR circuit 13 to the reset terminal R of the counter 8. The OR circuit 13 has two inputs of which the other input is supplied from output terminal $Q_3$ of the ring counter 5.

The input of the memory 10 receives the output of AND circuit 15 having two inputs one of which receives a signal controlled by a switch 14 and the other receives a 1 Hz signal from the frequency dividing circuit 2. The memory 10 is thus adapted to be set by operating the switch 14. When the switch 14 is closed 1 Hz signals are supplied to the memory 10 from the dividing circuit 2.

The counting output of the time counter 3, the counting output of the counter 8 and the memory contents of the memory 10 are supplied to a change-over circuit 16. The change-over circuit 16 is controlled by a three-step ring counter 18 having three output terminals $Q_1$, $Q_2$ and $Q_3$ and actuated by a manually operable switch 17. The selected output of the change-over circuit 16 is fed to a decoder driver 19 which activates a display device 20.

The operation of the electronic watch in accordance with the invention will now be described.

During normal operation, the ring counter 18 generates a signal of logic "1" at output terminal $Q_1$. This causes the change-over circuit 16 to select the counting contents of the time counter 3 which is displayed by the display device 20 through the decoder driver 19.

When it is desired for the watch to emit sound pulses at a selected interval, the switch 14 is operated so as to store the desired interval in the memory 10. For example if a pulse sound is to be generated every five seconds, the switch 14 is operated so that five pulses are fed from the frequency dividing circuit 2 to the memory 10. Thus the memory contents of the memory 10 becomes "5". The switch 4 is then operated to enable the output terminal $Q_1$ of the ring counter 5 to generate a signal of logic "1". This causes the counter 8 to commence counting. When the counting contents of the second counter of the counter 8 becomes "5", a coincidence signal is generated by the coincidence detecting circuit 9. In response to this coincidence signal, a pulse sound is generated in the pulse sound generating circuit 11. This coincidence signal also resets the counter 8 through the switch 12 (which is closed) and OR circuit 13. The counting operation is thereupon repeated in order to generate a pulse sound every five seconds thereafter so long as the ring counter 5 generates a signal of logic "1" at output terminal $Q_1$ and the switch 12 is closed. The contents of the memory circuit 10 can be changed by operation of the switch 14 to enable the interval of the pulse sound generating time to be selectively determined.

In order to determine the contents of the memory 10, it is necessary for them to be displayed. This is accomplished by operating the switch 17 in order to step the ring counter 18 so as to generate a signal of logic "1" from output terminal $Q_2$. The change-over circuit 16 is thereby actuated to select and feed out the contents of the memory 10 through the decoder driver 19 to the display device 20.

When the electronic watch is to be used as a chronograph the switch 12 is turned OFF and the switch 17 is operated so as to step the ring counter 18 to generate a signal of logic "1" from the output terminal $Q_3$. In this condition the counting contents of the counter 8 is displayed by the display device 20. With the change-over circuit in this condition, the switch 4 is operated once so that a signal of logic "1" is generated from output terminal $Q_1$ of the ring counter 5 whereupon the counter 8 commences to count. Further operation of the switch 4 causes a signal of logic "1" to be generated from output terminal $Q_2$ of the ring counter 5 whereupon output terminal $Q_1$ becomes logic "0" and the ring counter 8 stops counting. Still further operation of the switch 4 causes a signal of logic "1" to be generated from output terminal $Q_3$ of ring counter 5 whereupon a signal is fed through OR circuit 13 to the reset terminal R of the counter 10 so as to reset the counter. Repeating the above mentioned operation of the switch 4 thereafter enables the above described operating procedure to be repeated, that is to say the actions of START, STOP and RESET.

In case of using the electronic watch as a chronograph in the embodiment of the invention illustrated in the drawing, pulse sounds are not generated at desirable intervals. However, it is easily understood that it is possible to generate pulse sounds when using the electronic watch as a chronograph by providing an additional counter like counter 8. A switch not shown in the drawing for stopping the generation of pulse sounds if required is accommodated in the pulse sound generating circuit 11.

The counter 8 and memory 10 have a capacity sufficient for selecting an interval of seconds, minutes or hours between successive pulse sounds. Thus the pulse sounds can be generated at any interval from a comparatively short time to a comparatively long time. Since an audible sound pulse is produced at the interval selected, the user is informed of the passage of successive intervals without watching the visual display of the watch. This is highly useful for example in sport events where a participent needs to be informed of time intervals without having to look at his watch.

As explained above the electronic watch in accordance with the present invention is provided with a pulse sound generator that generates pulse sounds at predetermined and selected intervals. If the time interval is set at a few seconds, the electronic watch is effectively employed in determining comparatively short periods of time. However, the time interval can be set for longer periods for example minutes or hours. Accordingly the present invention is of great practical use.

It will be understood that the invention is in no way limited to the illustrated embodiment as various modifications or improvements may be made.

What is claimed is:

1. An electronic watch having chronographic performance comprising an oscillating circuit to provide a standard signal, frequency dividing circuit means for dividing said standard signal to provide a 1 Hz signal and also a higher frequency signal, first counter circuit means receiving said 1 Hz signal and providing a count of seconds, minutes and hours, and pulse sound generating circuit means for generating pulse sounds at different selected intervals of more than one second, said pulse sound generating means comprising a pulse sound generator, memory circuit means for memorizing a selected time interval at which said pulse sounds are to be emitted, manually operable means for setting the time interval memorized by said memory circuit means, second counter circuit means receiving and counting said higher frequency signal from said frequency dividing circuit means, and coincidence circuit means having inputs connected respectively with said memory circuit means and said second counter circuit means and an output connected with said pulse sound generating means and to a reset terminal of said second counter circuit means to activate said pulse sound generating circuit means and to reset said second counter circuit means upon coincidence of the output of said second counter means with the interval memorized by said memory circuit means.

2. An electronic watch according to claim 1, further comprising manually controlled means for selectively displaying time counted by said first counter circuit means and the selected time interval memorized by said memory circuit means.

3. An electronic watch according to claim 1, in which said means for setting the time interval comprises manually operable switch means and an AND gate having an output connected to said memory circuit means, one input connected with an output of said dividing circuit means and another input connected with said manually operable switch means.

4. An electronic watch according to claim 1, in which the frequency of said higher frequency signal provided by said frequency dividing circuit means is of the order of 100 Hz.

* * * * *